(12) United States Patent
Klee et al.

(10) Patent No.: US 10,483,506 B2
(45) Date of Patent: Nov. 19, 2019

(54) BATTERY PACK

(71) Applicant: Black & Decker Inc., New Britain, CT (US)

(72) Inventors: Ryan Klee, Baltimore, MD (US); Michael W. Roberts, Red Lion, PA (US); Nathan J. Osborne, Baltimore, MD (US); Gene Stidham, Finksburg, MD (US); Nicholas J. Garibaldi, Bel Air, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 15/950,414

(22) Filed: Apr. 11, 2018

(65) Prior Publication Data
US 2018/0331335 A1    Nov. 15, 2018

Related U.S. Application Data

(63) Continuation-in-part of application No. 15/194,161, filed on Jun. 27, 2016.

(51) Int. Cl.
*H01M 2/10* (2006.01)
*B25F 5/02* (2006.01)
*H01M 10/65* (2014.01)
*H01M 10/655* (2014.01)

(52) U.S. Cl.
CPC ............. *H01M 2/1022* (2013.01); *B25F 5/02* (2013.01); *H01M 2/1066* (2013.01); *H01M 2/1094* (2013.01); *H01M 10/65* (2015.04); *H01M 10/655* (2015.04); *H01M 2220/30* (2013.01)

(58) Field of Classification Search
CPC ............. H01M 2/1022; H01M 2/1066; H01M 2/1094; H01M 10/65; H01M 10/655; H01M 2220/30; B25F 5/02
See application file for complete search history.

(56) References Cited

U.S. PATENT DOCUMENTS

2016/0359151 A1* 12/2016 Beyerl ................ H01M 2/1055
2017/0373288 A1* 12/2017 Klee ................... H01M 2/1022

FOREIGN PATENT DOCUMENTS

CA          1304778 C   *  7/1992

* cited by examiner

*Primary Examiner* — Gregg Cantelmo
(74) *Attorney, Agent, or Firm* — Michael Aronoff

(57) ABSTRACT

The present invention includes a battery pack for a cordless power tool including a plastic housing including a mechanical interface for mechanically coupling the battery pack to a corresponding mechanical interface of a cordless power tool. The mechanical interface includes a rail, a groove and a sliding surface. The battery pack also includes a bracket encased within the plastic housing wherein the bracket includes a first portion positioned within the rail of the mechanical interface.

9 Claims, 18 Drawing Sheets

BATTERY PACK

RELATED APPLICATIONS

This application is a continuation-in-part of U.S. patent application Ser. No. 15/194,161, filed Jun. 27, 2016. This application also incorporates by reference in their entirety U.S. patent application Ser. No. 14/715,258, filed May 18, 2015, now U.S. Pat. No. 9,406,915, issued on Aug. 2, 2016, and titled "Power Tool System."

TECHNICAL FIELD

This application relates to cordless power tools and battery packs used in conjunction with cordless power tools. In one implementation, the invention is directed to a rechargeable battery pack for a cordless power tool having improved structural attributes and performance, particularly related to the mechanical interface between the battery pack and the power tool.

BACKGROUND

Various types of electric power tools are commonly used in construction, home improvement, outdoor, and do-it-yourself projects. Conventional power tools generally fall into two categories—corded power tools that are powered by an AC power source, e.g., an AC mains line, and cordless power tools that are powered by one or more DC power sources, e.g., a rechargeable battery pack.

The corded power tools generally are used for heavy duty applications that require high power and/or long runtimes, such as heavy duty sawing, heavy duty drilling and hammering, and heavy duty metal working. However, as their name implies, corded power tools require the use of a cord that can be connected to an AC power source. In many applications, such as on construction sites, it is not convenient or practical to find a continuously available AC power source and/or AC power must be generated by a portable power supply such as a generator, e.g. gas powered generator.

The cordless power tools generally are used for lighter duty applications that require low or medium power and/or short runtimes, such as light duty sawing, light duty drilling, and fastening. As cordless tools tend to be more limited in their power and/or runtime, they have not generally been accepted by the industry for all applications. They are also limited by weight since the higher capacity batteries tend to have greater weight, creating an ergonomic disadvantage.

As the desire for more powerful cordless power tools increases and as more powerful power tools are presented to the marketplace correspondingly more powerful battery packs to power the more powerful cordless tools must be developed. In order to provide more powerful battery packs, either additional cells are added to the battery pack or larger format cells are used in the battery pack. Under either circumstance the battery pack will increase in size and weight. The increased size and weight of the battery pack will place additional strain on the battery pack housing and mechanical interface system of the battery pack, particularly the rails of a rail and groove system common in slide-type battery packs.

SUMMARY

One aspect of the present invention is directed to a battery pack, comprising (1) a housing of a plastic material forming a mechanical interface for mechanically coupling the battery pack to a corresponding mechanical interface of a power tool, the housing mechanical interface including a rail, a groove and a sliding surface, the power tool mechanical interface including a rail, a groove and a sliding surface, wherein the housing mechanical interface is configured to receive the power tool rail in the housing groove between the housing rail and the housing sliding surface and the power tool mechanical interface is configured to receive the housing rail in the power tool groove between the power tool rail and the power tool sliding surface, and (2) a bracket encased within the housing plastic material, the bracket comprising a first portion positioned within the rail of the mechanical interface.

Another aspect of the present invention is directed to a battery pack, comprising (1) a housing of a plastic material forming a mechanical interface for mechanically coupling the battery pack to a corresponding mechanical interface of a power tool, the housing mechanical interface including a rail, a groove and a sliding surface, the power tool mechanical interface including a rail, a groove and a sliding surface, wherein the housing mechanical interface is configured to receive the power tool rail in the housing groove between the housing rail and the housing sliding surface and the power tool mechanical interface is configured to receive the housing rail in the power tool groove between the power tool rail and the power tool sliding surface, and (2) a U-shaped bracket encased within the housing plastic material wherein the bracket is positioned within the rail and the sliding surface and adjacent to the groove.

Another aspect of the present invention is directed to a battery pack, comprising (1) a housing comprising a plastic material and including a mechanical interface for mechanically coupling to a corresponding mechanical interface of a power tool, the mechanical interface comprising a rail, a groove and a sliding surface and (2) a U-shaped bracket encased within the housing plastic material wherein a first leg of the bracket is positioned within the rail and a second leg of the bracket is positioned adjacent to the sliding surface and a connecting member connecting the first leg and the second leg is positioned adjacent to the groove.

Another aspect of the present invention is directed to a method of manufacturing a battery pack, comprising the steps of (1) placing a metal U-shaped bracket in a mold; (2) placing a plastic material in the mold to surround the metal U-shaped bracket, such that the bracket is fixed in the plastic with (1) a first leg of the bracket positioned within a rail portion of a battery pack mechanical interface, (2) a second leg of the bracket positioned adjacent to a sliding surface of the battery pack mechanical interface and (3) a connecting member of the bracket connecting the first leg and the second and positioned adjacent to a groove of the battery pack mechanical interface.

Implementations of this aspect may include one or more of the following features.

Advantages may include one or more of the following: increased support for a removable battery pack when mated to a power tool, increased structural integrity for a removable battery pack mated to a power tool during operation of the power tool.

These and other advantages and features will be apparent from the description and the drawings.

DETAILED DESCRIPTION

Figure 1:
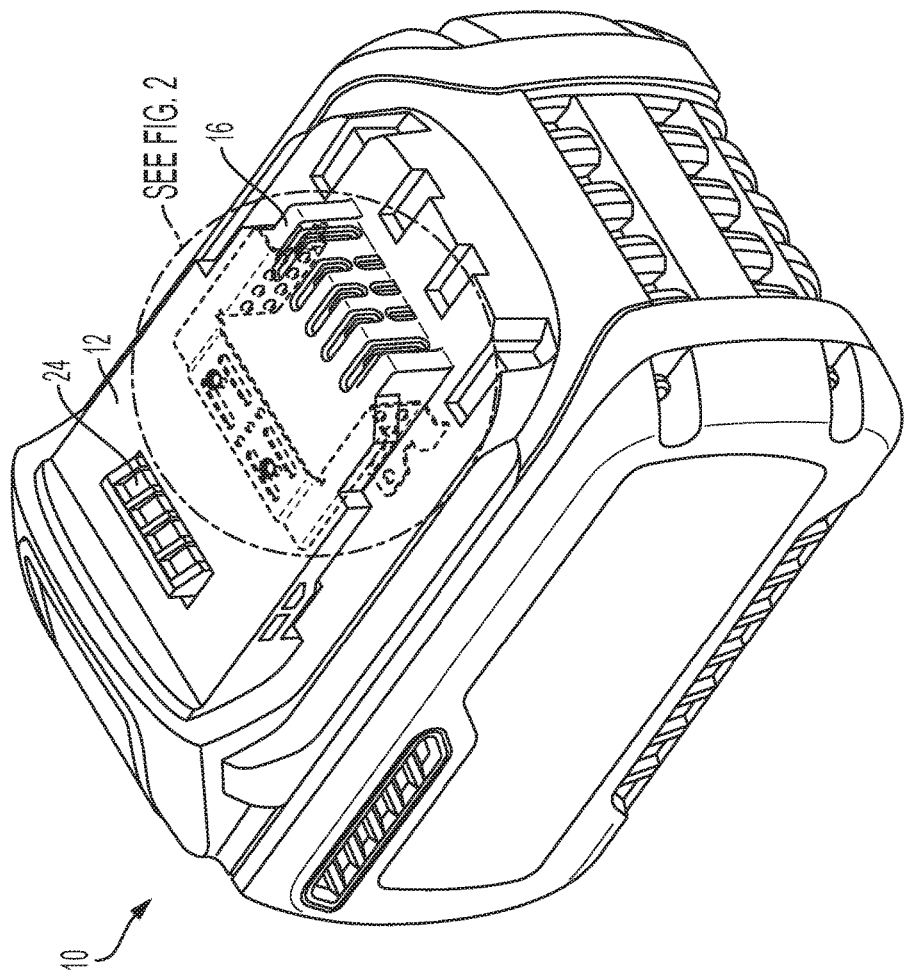
FIG. 1 is a perspective view of an exemplary battery pack of the present invention.

Referring to FIG. 1, there is illustrated a removable, rechargeable battery pack 10. The battery pack 10 may be used with a variety of cordless power tools, for example the cordless power tools illustrated and described in U.S. patent application Ser. No. 14/715,258, which is incorporated herein by reference. The battery pack 10 includes a housing 12. The housing 12 may be made of a plastic material such as Polycarbonate-Acrylonitrile butadiene styrene sold under the brand name Cycology C3650 or Glass Filled Nylons (PA6). The housing 12 may be constructed using an injection molding process as is generally well known in the art. The housing may be formed by creating multiple housing parts, for example, a top housing part, a bottom housing part, and two side housing part. Various other housing forms are contemplated and included the present invention.

Figure 8:
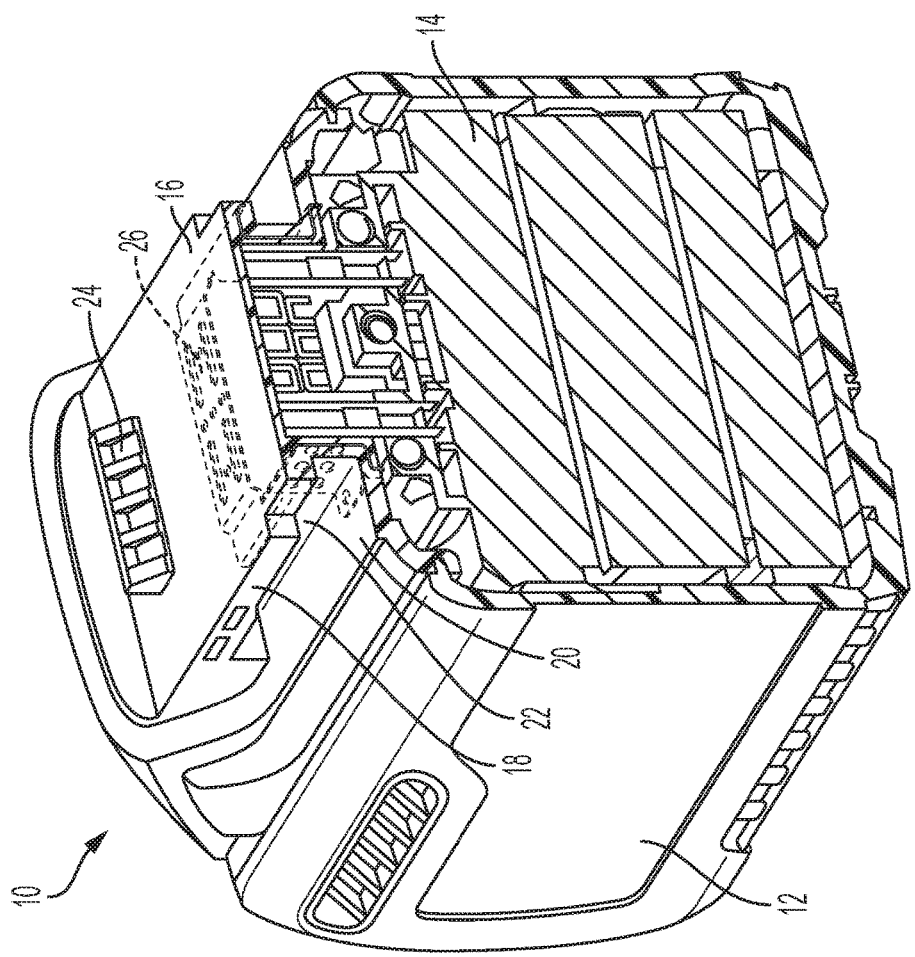
FIG. 8 is a section view of the battery pack of FIG. 7 along lines 8-8.

The battery pack 10 includes a plurality of battery cells 14, illustrated in FIG. 8, for providing power to the attached power tool. The battery pack may include a variety of battery cells in a variety of configurations, as illustrated and described in U.S. patent application Ser. No. 14/715,258.

The battery pack housing 12 includes a power tool interface 16 for coupling to and mating with the cordless power tool. The power tool interface 16 includes a mechanical interface and interface elements for mechanically coupling the battery pack 10 to a corresponding mechanical interface and interface elements of the power tool to physically couple and mate the battery pack to the power tool and an electrical interface and interface elements for electrically coupling the battery pack 10 to a corresponding electrical interface and interface elements of the power tool to electrically couple and mate the battery pack to the power tool.

The illustrated exemplary battery pack 10 is what is commonly referred to as a slide or slide-type battery pack. In this type of battery pack the mechanical interface includes a pair of rails 18, a pair of sliding surfaces 20 and a pair of grooves 22, wherein in the grooves are positioned between the related rail 18 and sliding surface 20. The mechanical interface of the power tool with which the battery pack 10 is designed to mate also includes a pair of rails, a pair of sliding surfaces and a pair of grooves. The battery pack 10 slides into mating engagement with the power tool. More particularly, the battery pack rails 18 slide along the sliding surfaces of the power tool and into the power tool grooves and the power tool rails slide along the battery pack sliding surface 20 and into the battery pack grooves 22. The battery pack mechanical interface may also include a latch 24 which is received in a corresponding catch of the power tool mechanical interface. Alternatively, the battery packs may utilize a tower type mechanical interface. Both of these types of mechanical interfaces are well known by those of ordinary skill in the art.

As noted above, as battery packs become heavier, either due to the number of battery cells in the battery pack and/or the size of the battery cells in the battery pack the amount of stress and force placed on the mechanical interface increases. In addition, as the battery packs are placed on larger power tools, the amount of stress and force placed on the battery packs in general and the mechanical interface in particular increase when the power tool is dropped or otherwise abused.

Figure 4:
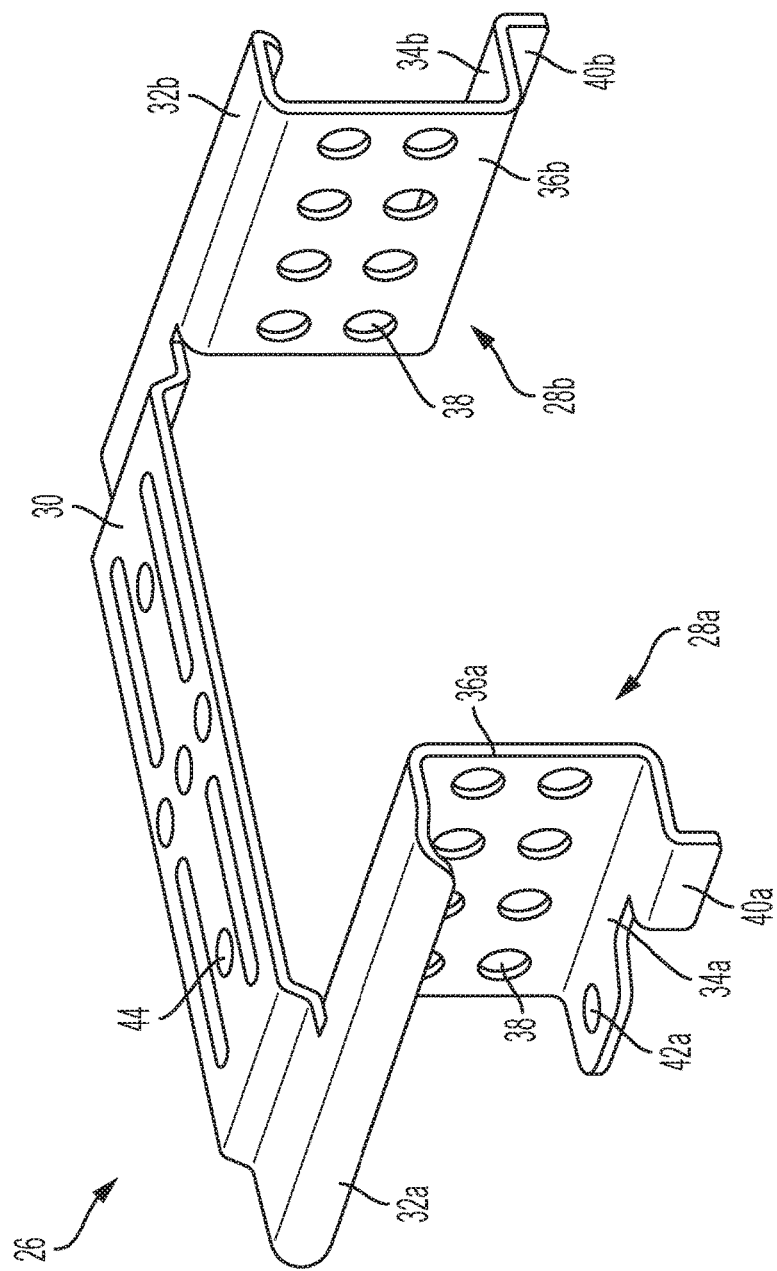
FIG. 4 is a perspective view of an exemplary insert of the present invention.

To this end, the present invention adds a bracket 26, also referred to as an insert, to the battery pack 10. Referring to FIG. 4, an exemplary embodiment of the bracket 26 is illustrated. In the exemplary embodiment, the bracket is made of a metal material, such as AISI 1070 Carbon Steel (65MN STEEL). Alternatively, the bracket 26 may be made of a ceramic material. In the exemplary embodiment, the bracket 26 includes two U-shaped members 28a, 28b. The U-shaped members 28a, 28b are connected by a crossbeam member 30. Each U-shaped member 28 includes a first portion or first leg 32, a second portion or second leg 34 and a connecting member 36 that connects the first leg 32 and the second leg 34. Each connecting member 36 may also include a plurality of through holes 38—which will be explained in further detail below. The second leg 34 may also include a support member 40—which will be explained in further detail below. The second leg may also include a through hole 42—which will be explained in further detail below. The crossbeam member 30 may also include a plurality of through holes 44.

Figure 5:
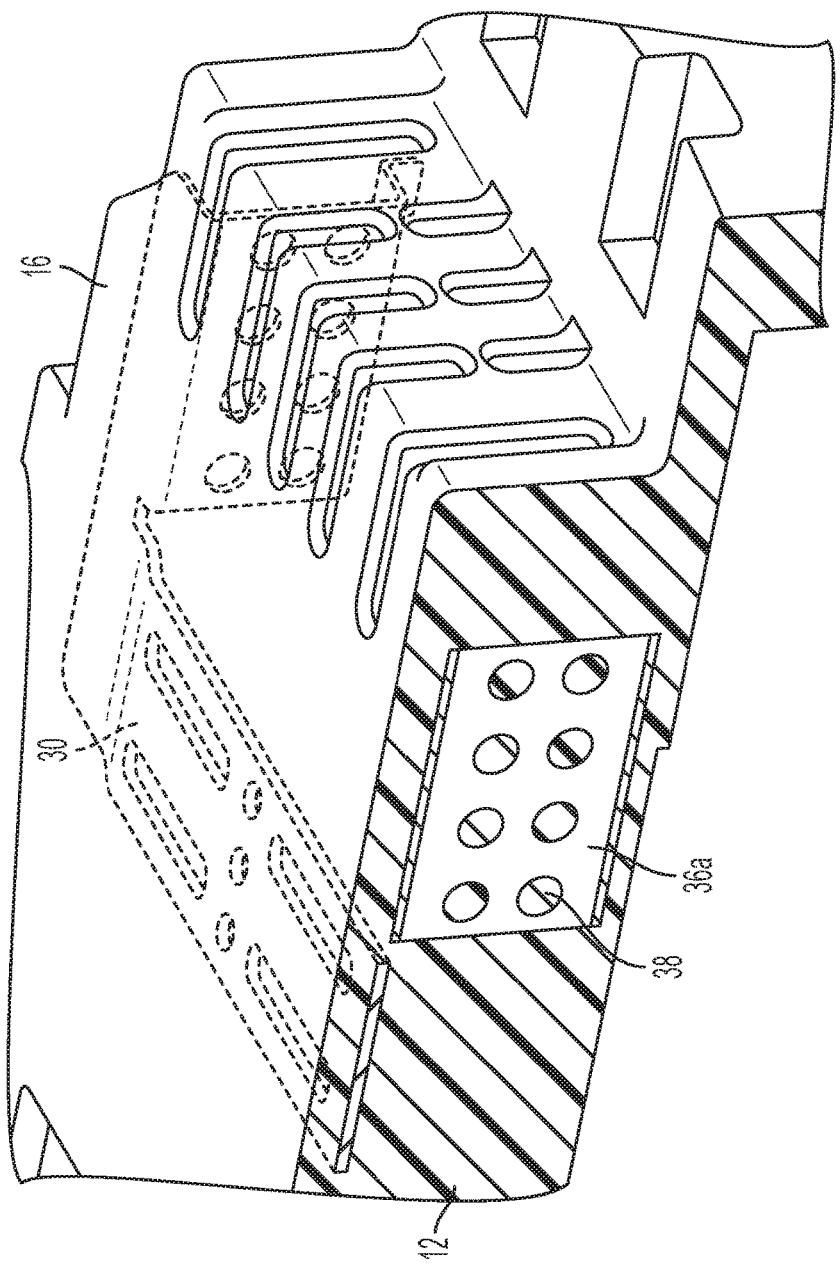
FIG. 5 is a section view of the battery pack of FIG. 2 along lines 5-5.

During the manufacture of the battery pack, the bracket 26 is placed in a mold shaped to form the top portion of the housing. The support members 40 rest on a base of the mold. A top of the mold may include pins that are received in the crossbeam through holes 44. The support members 40 and the pins/crossbeam through holes 44 serve to keep the bracket 26 in a fixed position relative to the mold such that as plastic material is injected into the mold the bracket 26 will remain in the desired position. As plastic material is injected into the mold, the plastic material surrounds and encases the bracket 26. As illustrated in FIG. 5, during the molding process, the plastic material flows through the though holes 38 of the connecting member 36 to fasten and fix the bracket to the plastic of the battery pack housing. In a preferred embodiment, a ratio of the surface area of the through holes (and as such the plastic that flows through the through holes) to the surface area of the connecting member is approximately 1:5 and in a more preferred embodiment the ratio is 1:2.

Figure 2:
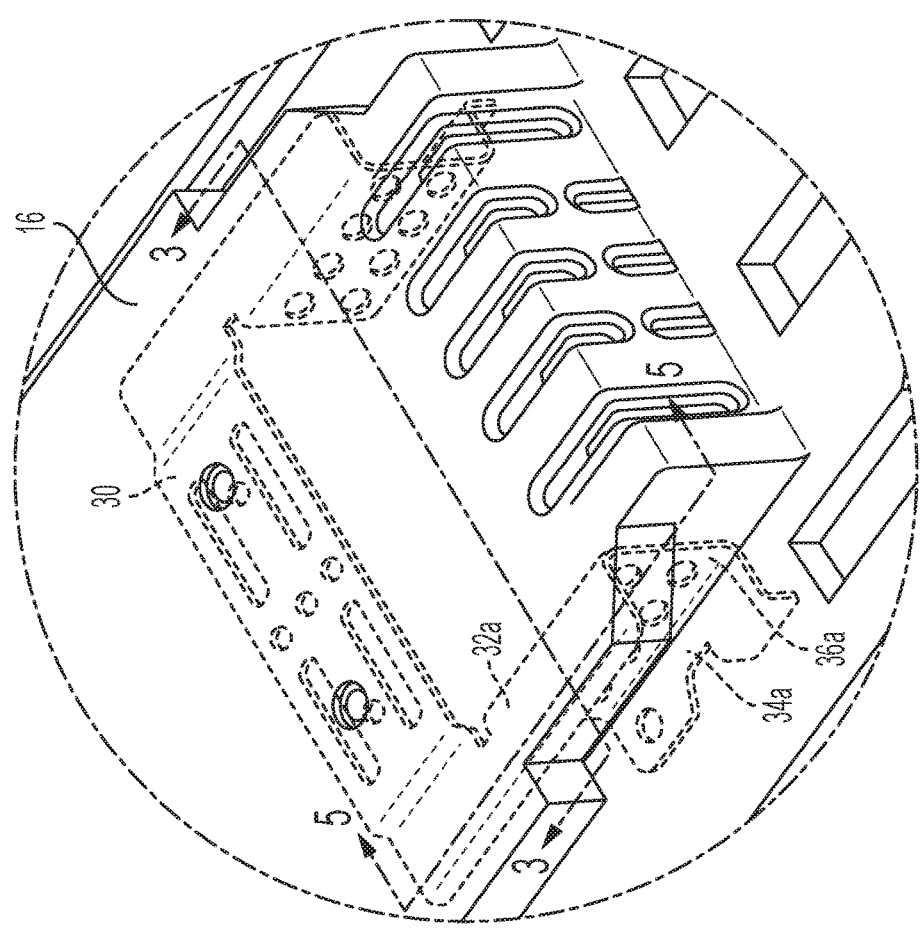
FIG. 2 is a perspective detail view of the battery pack of FIG. 1.
Figure 3:
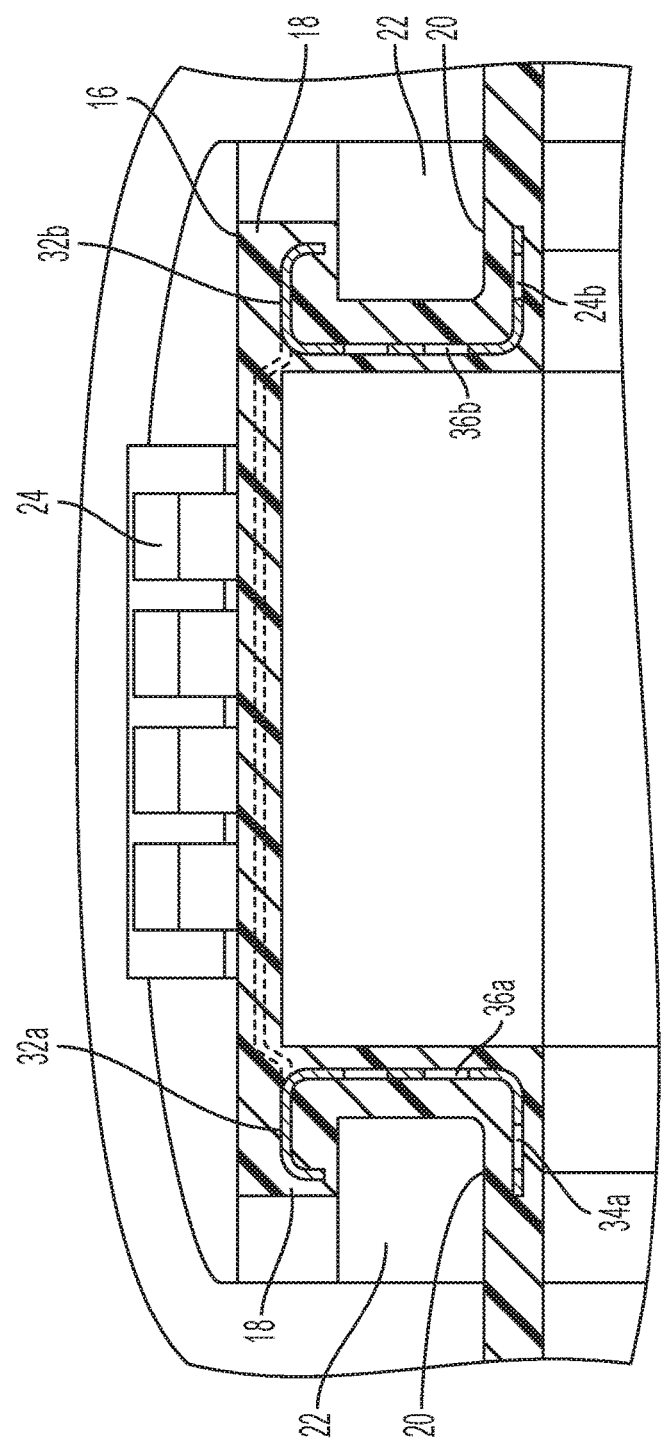
FIG. 3 a section view of the battery pack of FIG. 2 along lines 3-3.

As illustrated in FIGS. 1-3, the bracket 26 is positioned within and encased by the housing 12. With regard to each U-shaped portion 28, the first leg 32 is positioned within the rail 18. The second leg 34 is positioned just below (in the orientation of the figures) and adjacent to the sliding surface 20. The connecting member 36 is positioned just inside of (in the orientation of the figures) and adjacent to the groove 22. The crossbeam 30 traverses a central portion of the housing and connects the two U-shaped portions 28a, 28b.

The bracket 28 provides additional support for the rail system. The bracket assists in holding the rails to the rest of the housing and prevents cracking of the housing near or about the rail/housing interface due to forces related to the weight of the battery pack or to dropping the power tool while the battery pack is coupled to the power tool.

Figure 6:
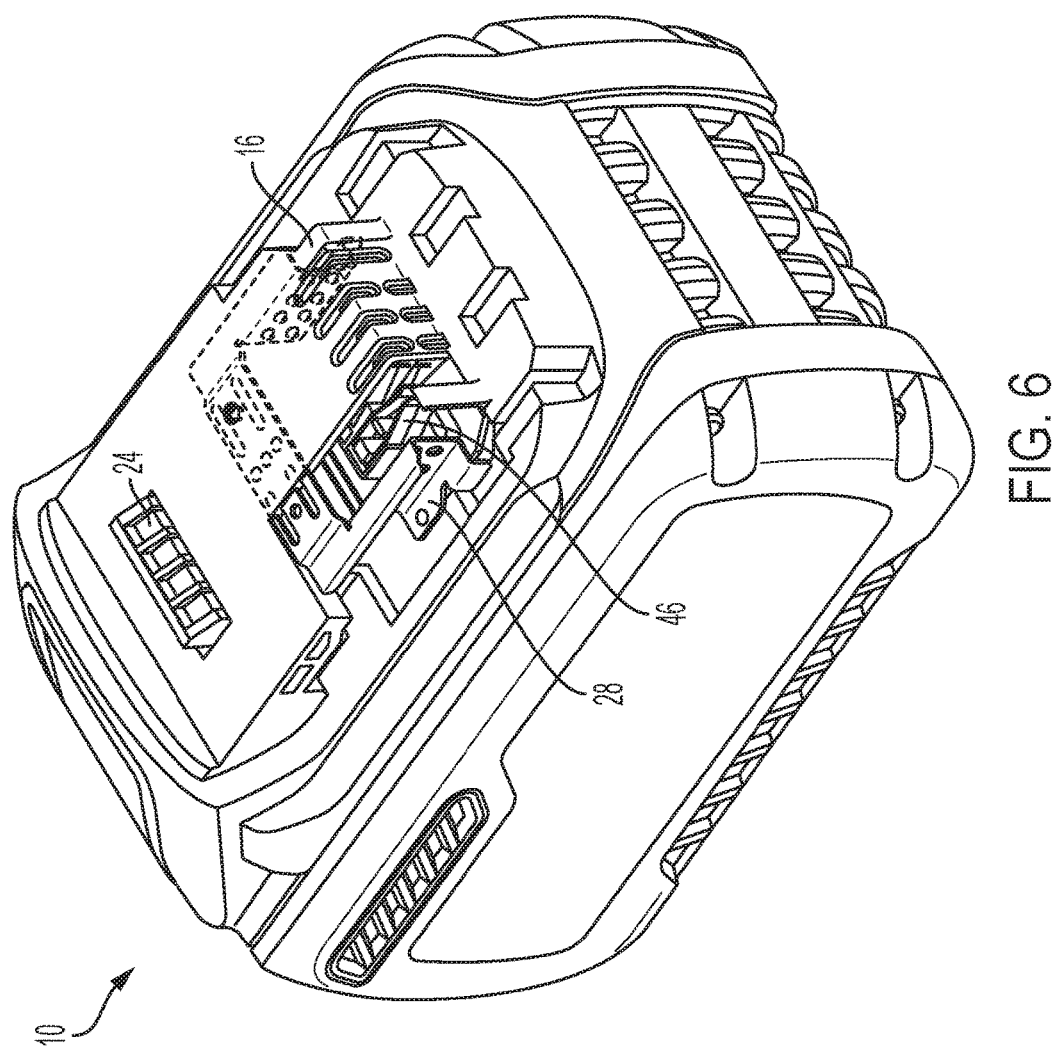
FIG. 6 is a perspective view of the battery pack of FIG. 1, including a partial cut-away of the battery pack housing to expose a portion of the insert of FIG. 4.
Figure 7:
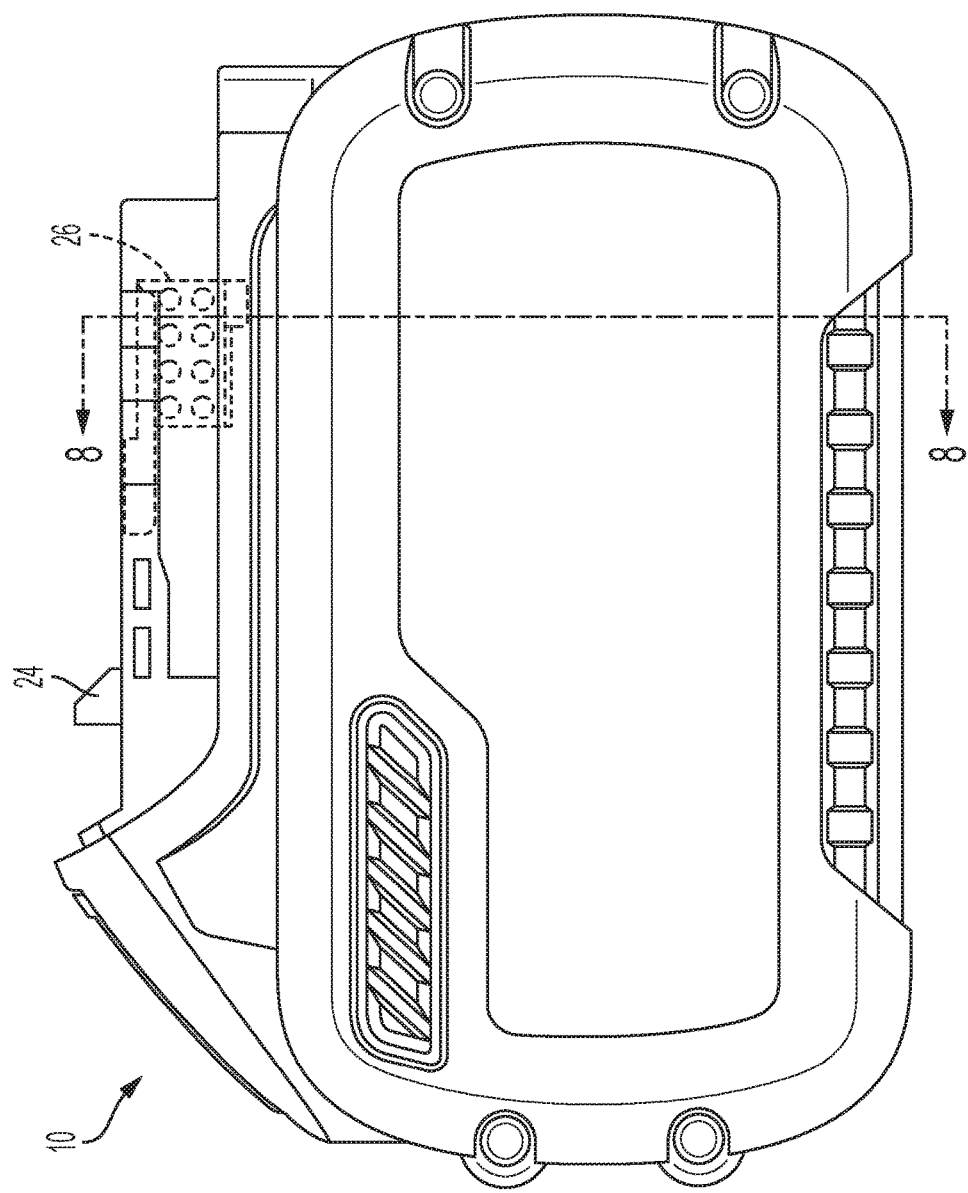
FIG. 7 is a side elevation view of the battery pack of FIG. 1.

Referring to FIG. 6, a set of battery pack terminals 46 are illustrated. The battery pack terminals 46 are part of the electrical interface of the battery pack 10. During operation of the power tool, the battery pack terminals 46 increase in temperature due to the currents flowing through the terminals 46 and the resistance of the terminals. The U-shaped portion of the bracket 26 is positioned within the plastic housing so as to sink some of the heat generated by the terminals.

The shape of the bracket 26 is defined to maximize the surface area of the bracket.

The following conduction equation may be used to maximize surface area.

$$q = kA(T_{Hot} - T_{Cold})/L$$

The surface area (A) of the bracket 28 may be maximized by cutting slots and/or holes in the bracket 28 and/or creating bends in the material. The bracket 28 may be created by a single stamping and bent to create the final part or the bracket 28 may be created by several stampings to create several parts that when placed properly form the appropriate shape. The bracket may also be formed by casting.

Figure 10:
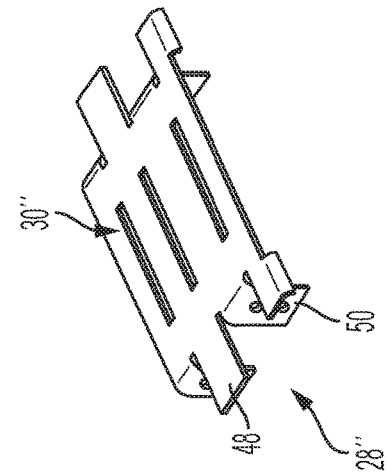
FIG. 10 is a perspective view of an alternate exemplary embodiment of an insert of the present invention.
Figure 9:
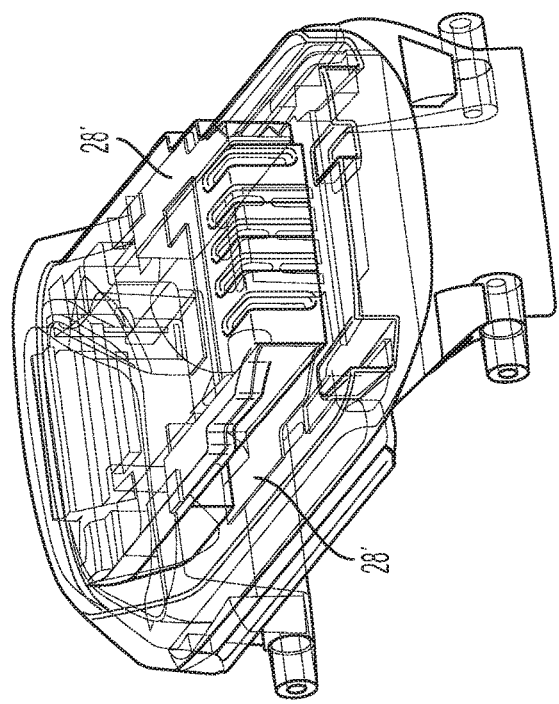
FIG. 9 is a perspective transparent view of a top portion of a battery pack housing of a battery pack illustrating an alternate exemplary embodiment of an insert of the present invention.

As illustrated in FIG. 9, in an alternate embodiment, a bracket 28' may be discrete U-shaped elements that are not connected by a crossbeam. Additionally, in another alternate embodiment, a bracket may be L-shaped elements with a first leg encased by the rail and the second leg encased by the housing adjacent to the groove. As illustrated in FIG. 10, in another alternate embodiment, a bracket 28" may be may include a first portion or leg 48 that is encased by the rail and a second portion or leg 50, offset from and perpendicular to the first leg 46 encased by the housing adjacent to the groove. The brackets 28" may be connected by a crossbeam 30".

In an alternate embodiment, all or part of the bracket may be formed as a wire mesh and bent to create a particular form.

In an alternate embodiment, the bracket 26 may be positioned in the injection mold such the crossbeam 30 abuts an upper portion of the mold to hold the bracket in place. As a result of this design, after the plastic material is injected into the mold and the housing is removed from the mold a portion of or all of the crossbeam 30 will be exposed. Thereafter, a label may be placed over the exposed metal to prevent electrostatic discharge.

In another alternate embodiment, the housing may be created in a two mold process. In other words, the bracket is encased in a first plastic (as described above) and the resultant plastic part is placed in a second mold and a second plastic (either of the same material as the first plastic part or of a different material) is injection molded around the first plastic part.

In another alternate embodiment, the second leg 34 of the bracket 28 serves as the sliding surface 20. In other words, the second leg 34 is not fully encased by the plastic material of the housing but one surface of the second leg 34 is exposed and in the same plane as the sliding surface 20.

Alternatively, a bracket or other metal insert may be encased in the plastic material in other parts and/or locations of the battery pack to provide additional strength for the parts. For example, an insert may be incorporated into the latch. Additionally, a metal insert can be placed in other parts of the battery pack housing to provide identifying information about the pack in the event of a catastrophic event.

Figure 11:
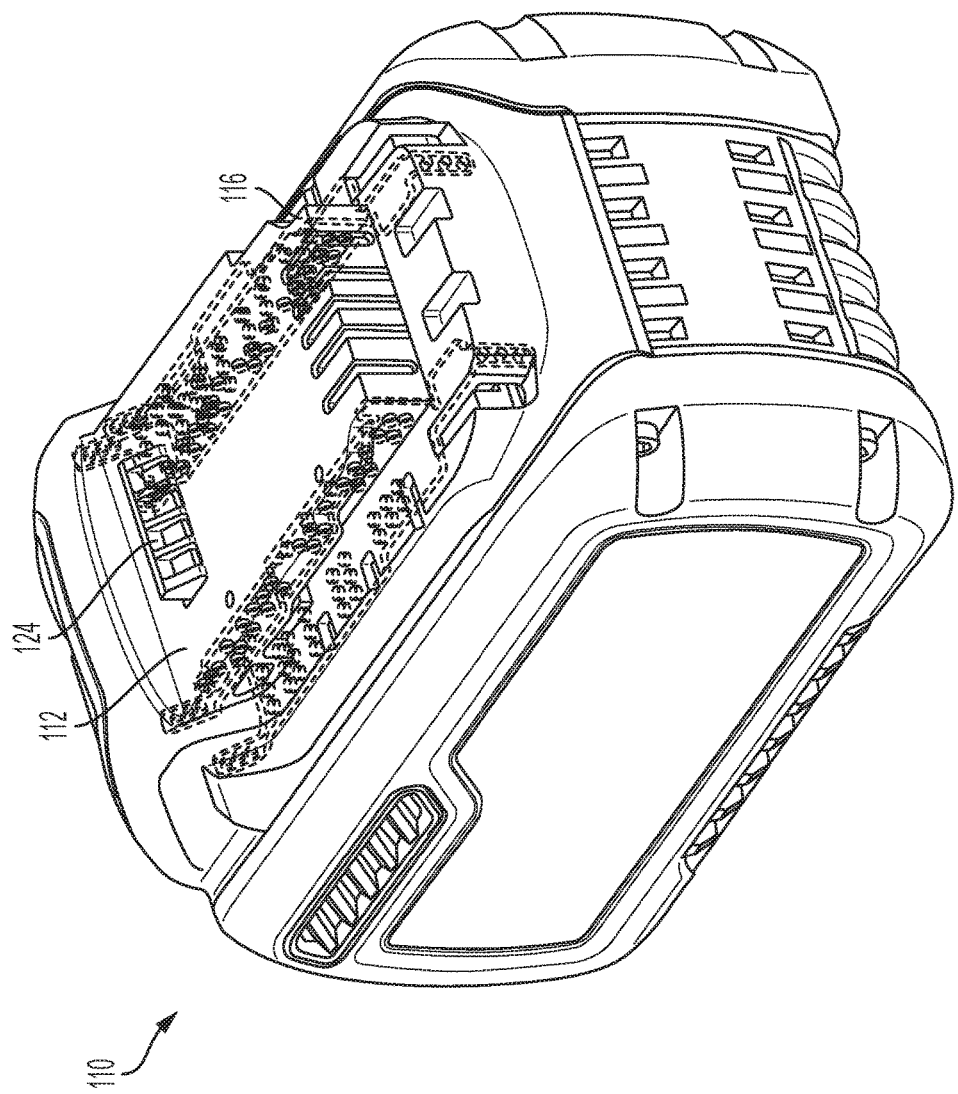
FIG. 11 is a perspective view of another exemplary battery pack of the present invention.

The present invention may include another alternate embodiment of an insert, as illustrated in FIGS. 11-20. Referring to FIG. 11, there is illustrated a removable, rechargeable battery pack 110. The battery pack 110 may be used with a variety of cordless power tools, for example the cordless power tools illustrated and described in U.S. patent application Ser. No. 14/715,258, which is incorporated herein by reference. The battery pack 110 includes a housing 112. The housing 112 may be made of a plastic material such as Polycarbonate-Acrylonitrile butadiene styrene sold under the brand name Cycology C3650 or Glass Filled Nylons (PA6). The housing 112 may be constructed using an injection molding process as is generally well known in the art. The housing may be formed by creating multiple housing parts, for example, a top housing part, a bottom housing part, and two side housing part. Various other housing forms are contemplated and included the present invention.

Figure 18:
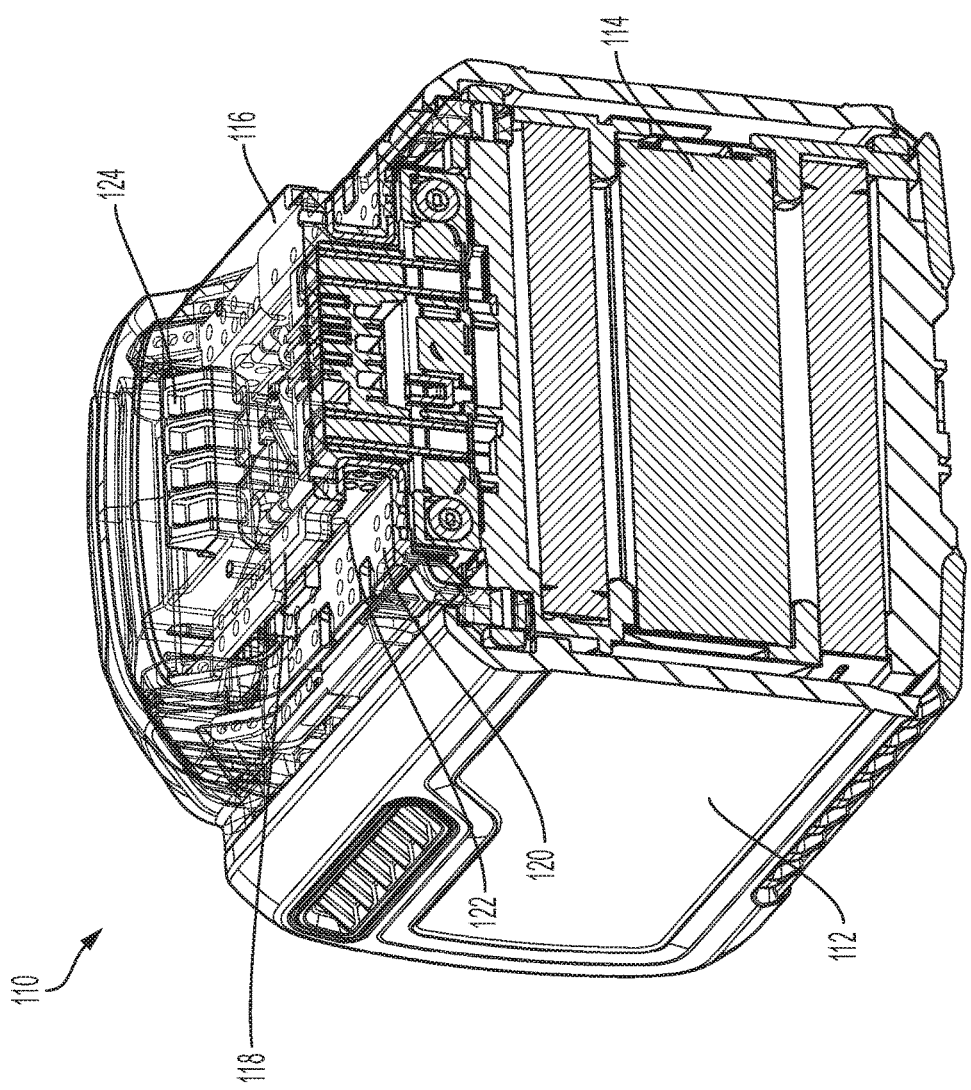
FIG. 18 is a section view of the battery pack of FIG. 17 along lines 18-18.

The battery pack 110 includes a plurality of battery cells 114, illustrated in FIG. 18, for providing power to the attached power tool. The battery pack may include a variety of battery cells in a variety of configurations, as illustrated and described in U.S. patent application Ser. No. 14/715, 258.

The battery pack housing 112 includes a power tool interface 116 for coupling to and mating with the cordless power tool. The power tool interface 116 includes a mechanical interface and interface elements for mechanically coupling the battery pack 110 to a corresponding mechanical interface and interface elements of the power tool to physically couple and mate the battery pack to the power tool and an electrical interface and interface elements for electrically coupling the battery pack 110 to a corresponding electrical interface and interface elements of the power tool to electrically couple and mate the battery pack to the power tool.

The illustrated exemplary battery pack 110 is what is commonly referred to as a slide or slide-type battery pack. In this type of battery pack the mechanical interface includes a pair of rails 118, a pair of sliding surfaces 120 and a pair of grooves 122, wherein in the grooves are positioned between the related rail 118 and sliding surface 120. The mechanical interface of the power tool with which the battery pack 110 is designed to mate also includes a pair of rails, a pair of sliding surfaces and a pair of grooves. The battery pack 110 slides into mating engagement with the power tool. More particularly, the battery pack rails 118 slide along the sliding surfaces of the power tool and into the power tool grooves and the power tool rails slide along the battery pack sliding surface 120 and into the battery pack grooves 122. The battery pack mechanical interface may also include a latch 124 which is received in a corresponding catch of the power tool mechanical interface. Alternatively, the battery packs may utilize a tower type mechanical interface. Both of these types of mechanical interfaces are well known by those of ordinary skill in the art.

As noted above, as battery packs become heavier, either due to the number of battery cells in the battery pack and/or the size of the battery cells in the battery pack the amount of stress and force placed on the mechanical interface increases. In addition, as the battery packs are placed on larger power tools, the amount of stress and force placed on the battery packs in general and the mechanical interface in particular increase when the power tool is dropped or otherwise abused.

Figure 14:
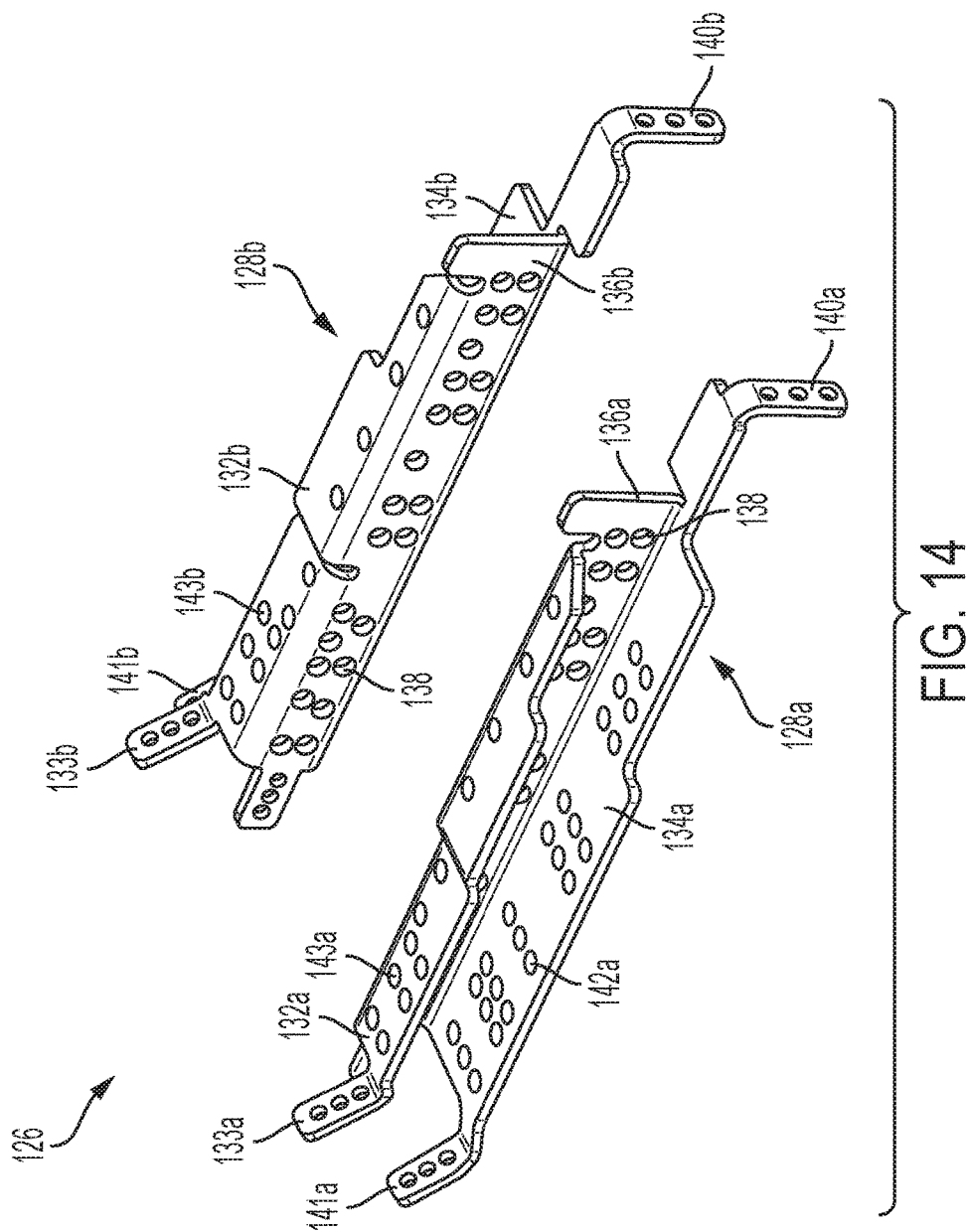
FIG. 14 is a perspective view of another exemplary insert of the present invention.
Figure 15:
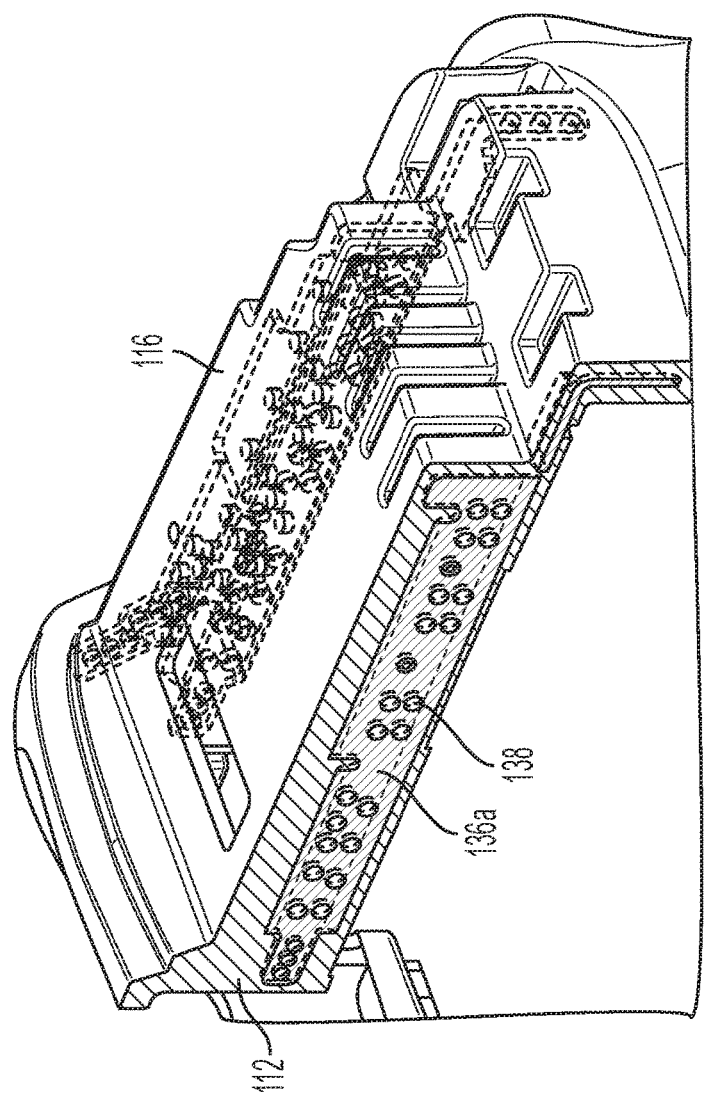
FIG. 15 is a section view of the battery pack of FIG. 12 along lines 15-15.

To this end, the present invention adds a bracket 126, also referred to as an insert, to the battery pack 110. Referring to FIG. 14, an exemplary embodiment of the bracket 126 is illustrated. In the exemplary embodiment, the bracket is made of a metal material, such as SUS316 stainless steel, approximately 1 mm thick. Alternatively, the bracket 126 may be made of a ceramic material. In the exemplary embodiment, the bracket 126 includes two U-shaped members 128a, 128b. Each U-shaped member 128 includes a first portion or first leg 132, a second portion or second leg 134 and a connecting member 136 that connects the first leg 132 and the second leg 134. Each connecting member 136 may also include a plurality of through holes 138—which will be explained in further detail below. The first leg 132 may also include a first support member 133. The second leg 134 may also include a first support member 140 and a second support member 141—which will be explained in further detail below. The second leg may also include a plurality of through holes 142 and the first leg may also include a plurality of through holes 143—which will be explained in further detail below.

During the manufacture of the battery pack, the bracket 126 is placed in a mold shaped to form the top portion of the housing. The support members 140 rest on a base of the mold. A top of the mold may include pins that are received in a subset of the plurality of through holes 138, 142, 143. The support members 140, 141 and the pins through holes 138, 142, 143 serve to keep the bracket 126 in a fixed position relative to the mold such that as plastic material is injected into the mold the bracket 126 will remain in the desired position. As plastic material is injected into the mold, the plastic material surrounds and encases the bracket 126. As illustrated in FIG. 5, during the molding process, the plastic material flows through some of the though holes 138, 142, 143 of the first leg 132, second leg 134 and the connecting member 136 to fasten and fix the bracket 126 to the plastic of the battery pack housing. In a preferred embodiment, a ratio of the surface area of the through holes (and as such the plastic that flows through the through holes) to the surface area of the connecting member is approximately 1:5 and in a more preferred embodiment the ratio is 1:2.

Figure 12:
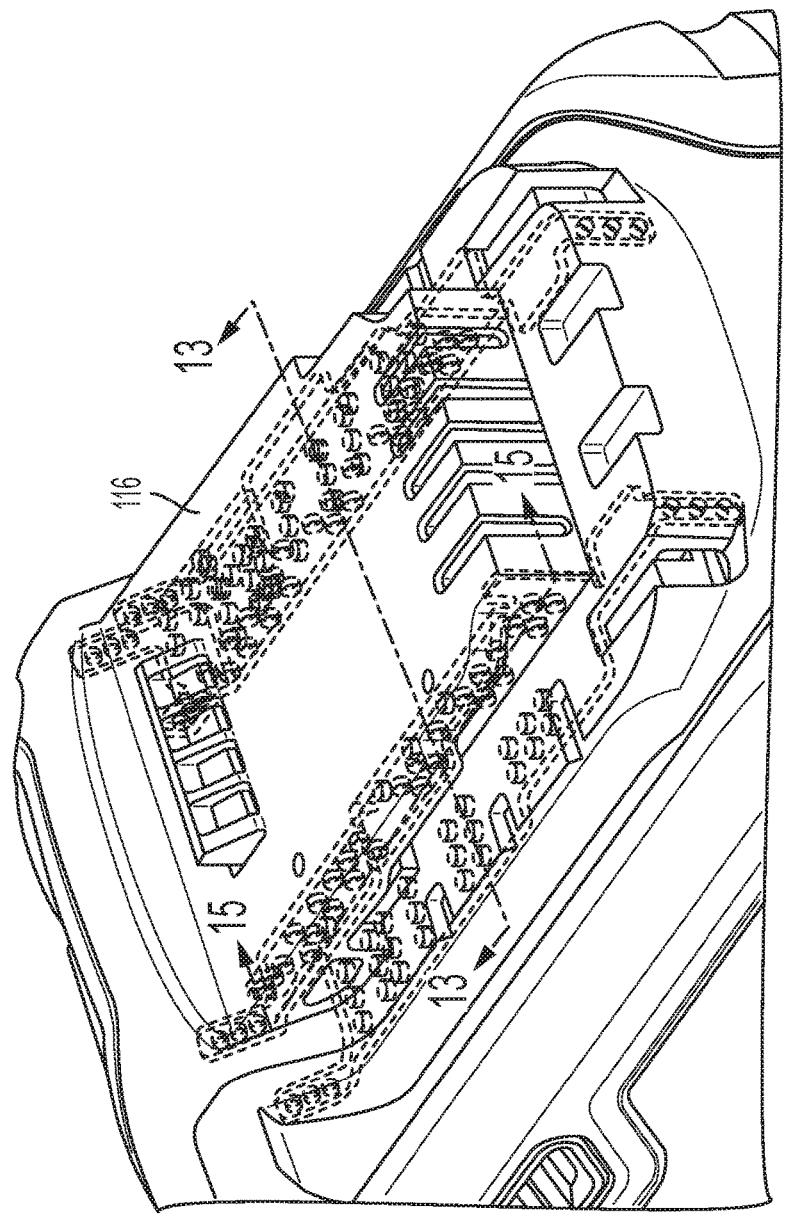
FIG. 12 is a perspective detail view of the battery pack of FIG. 11.
Figure 13:
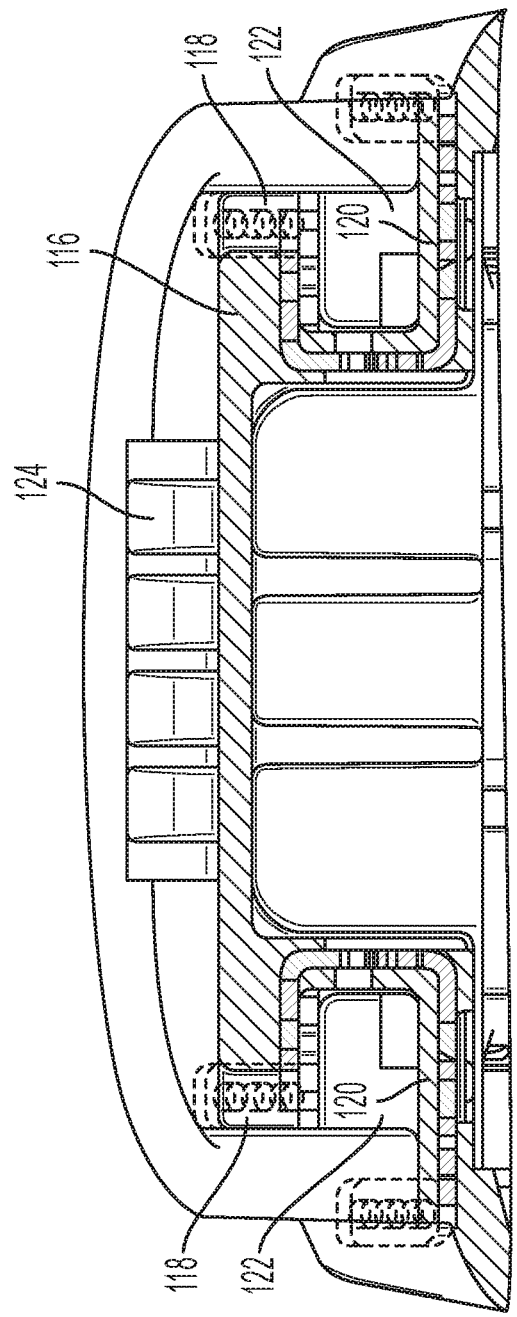
FIG. 13 a section view of the battery pack of FIG. 12 along lines 13-13.

As illustrated in FIGS. 11-13, the bracket 126 is positioned within and encased by the housing 112. With regard to each U-shaped portion 128, the first leg 132 is positioned within the rail 118. The second leg 134 is positioned just below (in the orientation of the figures) and adjacent to the sliding surface 120. The connecting member 136 is positioned just inside of (in the orientation of the figures) and adjacent to the groove 122.

The bracket 126 provides additional support for the rail system. The U-shaped members 128 assists in holding the rails 118 to the rest of the housing and prevents cracking of the housing near or about the rail/housing interface due to forces related to the weight of the battery pack or to dropping the power tool while the battery pack is coupled to the power tool.

Figure 16:
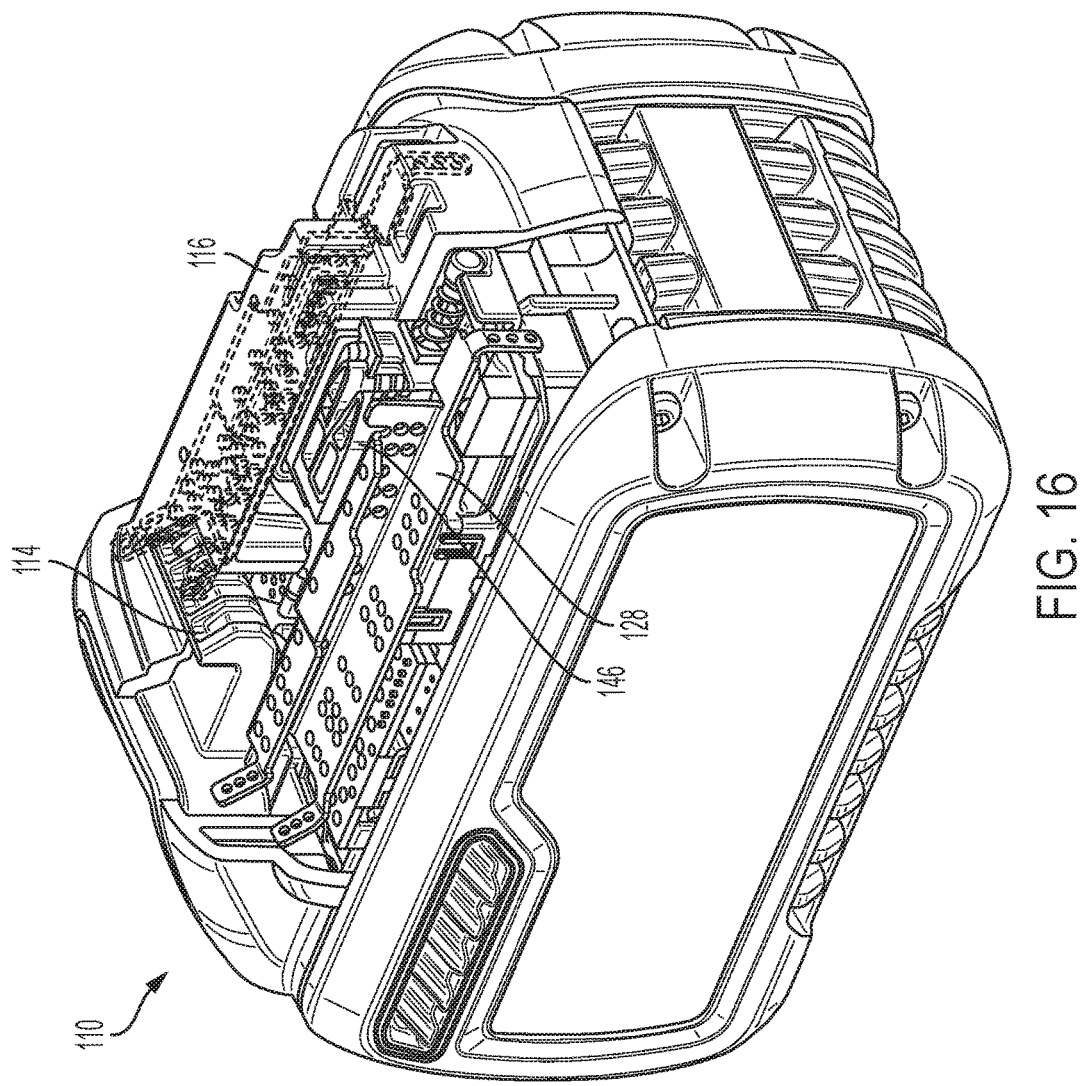
FIG. 16 is a perspective view of the battery pack of FIG. 11 including a partial cut-away of the battery pack housing to expose a portion of the insert of FIG. 14.
Figure 17:
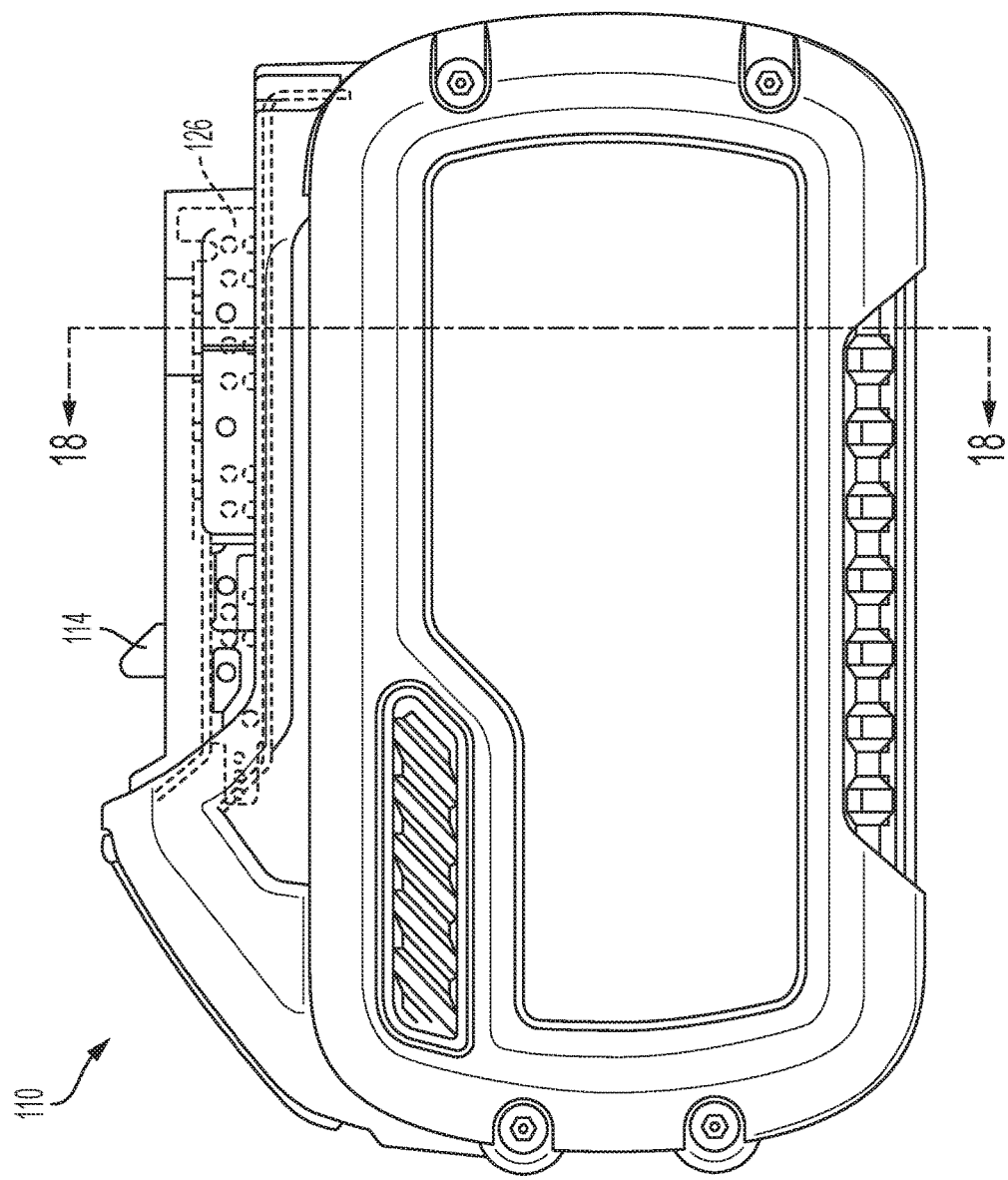
FIG. 17 is a side elevation view of the battery pack of FIG. 11

Referring to FIG. 16, a set of battery pack terminals 146 are illustrated. The battery pack terminals 146 are part of the electrical interface of the battery pack 110. During operation of the power tool, the battery pack terminals 146 increase in temperature due to the currents flowing through the terminals 146 and the resistance of the terminals. The U-shaped portion of the bracket 126 is positioned within the plastic housing so as to sink some of the heat generated by the terminals.

The shape of the bracket 126 is defined to maximize the surface area of the bracket.

The following conduction equation may be used to maximize surface area.

$$q = kA(T_{Hot} - T_{Cold})/L$$

The surface area (A) of the bracket 126 may be maximized by cutting slots and/or holes in the U-shaped members 128 and/or creating bends in the material. The bracket 126 may be created by a single stamping and bent to create the final part or the bracket 126 may be created by several stampings to create several parts that when placed properly form the appropriate shape. The bracket may also be formed by casting.

Figure 20:
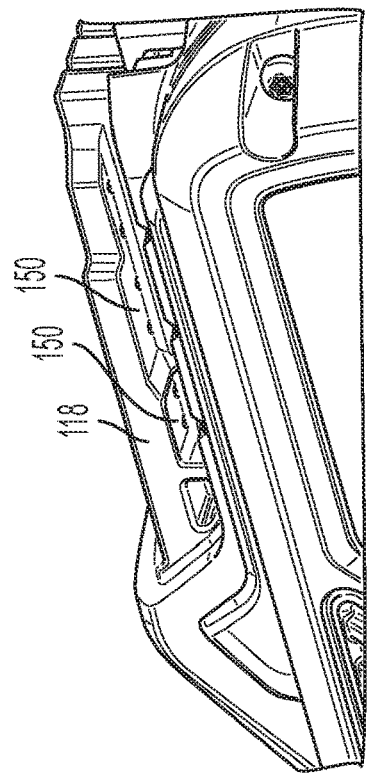
FIG. 20 is a detail view of the wear surfaces of the insert of FIG. 19.
Figure 19:
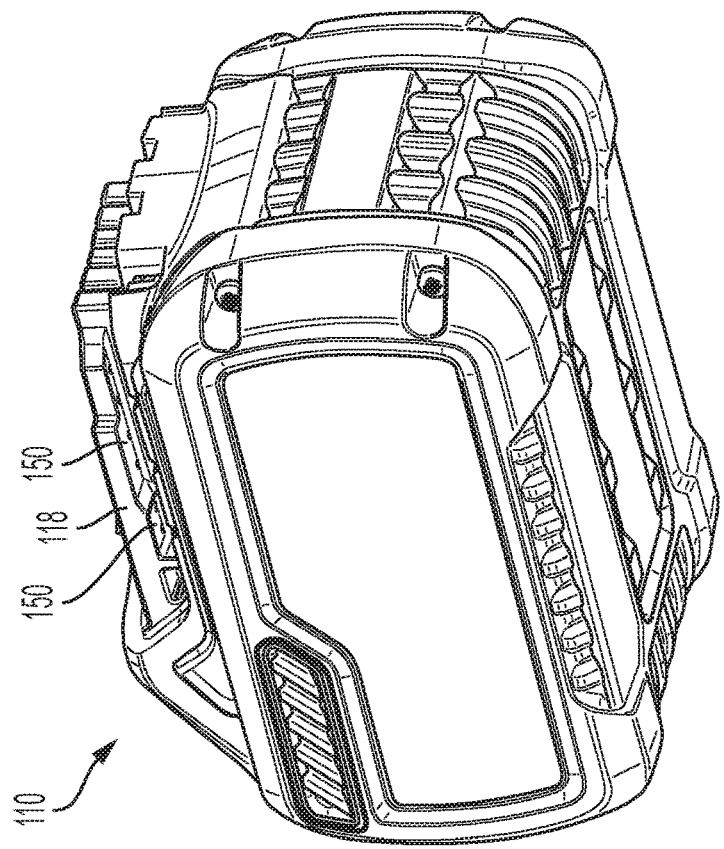
FIG. 19 is a perspective view of the battery pack of FIG. 11 detailing wear surfaces of the insert of FIG. 14.

As illustrated in FIGS. 19 and 20, each U-shaped member 128 of the bracket 126 includes at least one exposed wear surface 150. The wear surface 150 is positioned at a lower or interior surface of the rail 118. At the wear surface locations, the plastic of the battery pack housing is not present. The wear surface 118 moves along an upper surface of a corresponding rail of a mated power tool. As such, the wear surface 150 of the bracket 128 slides along the power tool rail during mating and rests on the power tool rail during operation of the power tool. This provides two similar advantages. First, when the battery pack 110 is mated to a power tool, friction between the battery pack rail 118 and the power tool rail is reduced and there is less wear on the battery pack rail 118 during mating of the power tool and the battery pack. Second, when the battery pack is mated to the power tool and the power tool is operated, the friction between the battery pack rail 118 and the power tool rail is reduced. This significantly decreases the wear on the battery pack rail 118 and the power tool rail and therefore significantly reduces the likelihood that either rail will be worn and fail during operation or during a drop. The metal wear surface 150 will also wick away heat that may be caused by friction due to the relative movement of the battery pack and power tool during operation.

During operation of some cordless power tools, such as impact drivers, jack hammers and other tools that result in significant movement of the tool during operation, there is significant relative motion between the battery pack and the power tool, particularly between the rail of the power tool and the rail of the battery pack. The metal wear surfaces significantly reduce the friction and therefore wear on these parts of the battery pack and power tool.

Numerous modifications may be made to the exemplary implementations described above. These and other implementations are within the scope of this application.

The invention claimed is:

1. A battery pack, comprising:
   a housing of a plastic material, the housing including a mechanical interface for mechanically coupling the battery pack to a corresponding mechanical interface of a power tool in a first direction,
   the housing mechanical interface including a rail, a groove and a sliding surface, the housing rail and the housing sliding surface being opposed to each other on opposing sides of the housing groove,
   the housing mechanical interface configured to receive a power tool rail in the housing groove between the housing rail and the housing sliding surface, and
   a bracket partially encased within the housing plastic material, the bracket comprising a first portion positioned within the housing mechanical interface rail, the first portion including a wear surface positioned at a lower surface of the housing mechanical interface rail and exposed to the housing mechanical interface groove.

2. The battery pack, as recited in claim 1, wherein the wear surface moves along an upper surface of the power tool rail.

3. The battery pack, as recited in claim 1, wherein the wear surface slides along the power tool rail during mating of the battery pack and the power tool.

4. The battery pack, as recited in claim 3, wherein the wear surface rests on the power tool rail during operation of the power tool.

5. The battery pack, as recited in claim 1, wherein the wear surface has a lower coefficient of friction that the housing plastic material.

6. The battery pack, as recited in claim 1, wherein the wear surface reduces friction between the battery pack and the power tool during mating of the battery pack and the power tool.

7. The battery pack, as recited in claim 1, wherein the wear surface reduces friction between the battery pack rail and the power tool rail during operation of the power tool.

8. The battery pack, as recited in claim 1, wherein the wear surface reduces wear on the battery pack rail and the power tool rail during operation of the power tool.

9. The battery pack, as recited in claim 1, wherein the wear surface wicks heat away from the power tool rail due to relative movement of the battery pack and the power tool during operation of the power tool.

* * * * *